United States Patent
Kiyonaga et al.

(10) Patent No.: US 10,550,747 B2
(45) Date of Patent: Feb. 4, 2020

(54) COMBUSTION SYSTEM FOR SHIPS

(71) Applicants: The Chugoku Electric Power Co., Inc., Hiroshima (JP); Tokyo Metropolitan University, Tokyo (JP)

(72) Inventors: Eiji Kiyonaga, Hiroshima (JP); Kenji Hikino, Hiroshima (JP); Keiichiro Morita, Hiroshima (JP); Akihiro Nakamura, Hiroshima (JP); Masatake Haruta, Tokyo (JP); Toru Murayama, Tokyo (JP); Makoto Mino, Tokyo (JP)

(73) Assignees: The Chugoku Electric Power Co., Inc., Hiroshima (JP); Tokyo Metropolitan University, Tokyo (JP)

( * ) Notice: Subject to any disclaimer, the term of this patent is extended or adjusted under 35 U.S.C. 154(b) by 0 days.

(21) Appl. No.: 15/764,222

(22) PCT Filed: Mar. 7, 2017

(86) PCT No.: PCT/JP2017/009050
§ 371 (c)(1),
(2) Date: Mar. 28, 2018

(87) PCT Pub. No.: WO2018/047383
PCT Pub. Date: Mar. 15, 2018

(65) Prior Publication Data
US 2018/0272278 A1 Sep. 27, 2018

(30) Foreign Application Priority Data
Sep. 12, 2016 (JP) .................... PCT/JP2016/076870

(51) Int. Cl.
*F01N 3/28* (2006.01)
*B01D 53/90* (2006.01)
(Continued)

(52) U.S. Cl.
CPC ....... *F01N 3/2842* (2013.01); *B01D 53/8628* (2013.01); *B01D 53/90* (2013.01);
(Continued)

(58) Field of Classification Search
CPC ... B01D 53/96; B01D 53/9418; F01N 3/2066; F01N 2570/14; B01J 38/66; B01J 23/22
(Continued)

(56) References Cited

U.S. PATENT DOCUMENTS 4,466,947 A 8/1984 Imanari et al.
4,833,113 A 5/1989 Imanari et al.
(Continued)

FOREIGN PATENT DOCUMENTS

EP 2610454 A1 8/2011
JP S51-104489 A 9/1976
(Continued)

OTHER PUBLICATIONS

Japanese Notification of Reasons for Refusal cited in corresponding application JP2016-560930, dated Nov. 15, 2016, 3 pages.
(Continued)

*Primary Examiner* — Tom P Duong
(74) *Attorney, Agent, or Firm* — Muncy, Geissler, Olds & Lowe, P.C.

(57) ABSTRACT

A combustion system for ships operated at low cost is provided. A combustion system 1 for ships includes an internal combustion engine 20 that burns fuel, an exhaust line L2 through which exhaust gas flows, the exhaust gas being generated through combustion of the fuel in the internal combustion engine 20, an exhaust heat recovery device 40 that is disposed in the exhaust line L2 and that recovers exhaust heat from the exhaust gas discharged from the internal combustion engine 20, and a denitration device 50 that is disposed in the exhaust line L2 and that removes nitrogen oxide from the exhaust gas using a denitration catalyst. The denitration device 50 is disposed downstream from the exhaust heat recovery device 40 in the exhaust line L2. The denitration catalyst contains 43 wt % or more of vanadium pentoxide and has a BET specific surface area of 30 m²/g or more.

5 Claims, 15 Drawing Sheets

(51) Int. Cl.

| | | |
|---|---|---|
| B01D 53/94 | (2006.01) | |
| B01D 53/96 | (2006.01) | |
| B01J 23/22 | (2006.01) | |
| B01J 23/92 | (2006.01) | |
| B01J 35/00 | (2006.01) | |
| B01J 35/10 | (2006.01) | |
| B01J 37/00 | (2006.01) | |
| B01J 37/02 | (2006.01) | |
| B01J 37/03 | (2006.01) | |
| B01J 37/08 | (2006.01) | |
| B01J 38/02 | (2006.01) | |
| B01J 38/48 | (2006.01) | |
| B01J 38/64 | (2006.01) | |
| B01J 38/66 | (2006.01) | |
| F01N 3/021 | (2006.01) | |
| F01N 3/02 | (2006.01) | |
| F01N 3/20 | (2006.01) | |
| F01N 13/00 | (2010.01) | |
| B01D 53/86 | (2006.01) | |

(52) U.S. Cl.
CPC ......... *B01D 53/9418* (2013.01); *B01D 53/96* (2013.01); *B01J 23/22* (2013.01); *B01J 23/92* (2013.01); *B01J 35/002* (2013.01); *B01J 35/1014* (2013.01); *B01J 37/0009* (2013.01); *B01J 37/0219* (2013.01); *B01J 37/036* (2013.01); *B01J 37/08* (2013.01); *B01J 37/082* (2013.01); *B01J 37/088* (2013.01); *B01J 38/02* (2013.01); *B01J 38/485* (2013.01); *B01J 38/64* (2013.01); *B01J 38/66* (2013.01); *F01N 3/021* (2013.01); *F01N 3/0205* (2013.01); *F01N 3/208* (2013.01); *F01N 3/2066* (2013.01); *F01N 3/28* (2013.01); *F01N 3/2803* (2013.01); *F01N 13/009* (2014.06); *B01D 53/9436* (2013.01); *B01D 2251/206* (2013.01); *B01D 2255/20707* (2013.01); *B01D 2255/20723* (2013.01); *B01D 2255/9207* (2013.01); *B01D 2258/012* (2013.01); *B01D 2259/4566* (2013.01); *F01N 2330/00* (2013.01); *F01N 2330/06* (2013.01); *F01N 2330/08* (2013.01); *F01N 2330/42* (2013.01); *F01N 2370/02* (2013.01); *F01N 2510/068* (2013.01); *F01N 2570/14* (2013.01); *F01N 2590/02* (2013.01); *F01N 2610/02* (2013.01); *Y02T 10/16* (2013.01)

(58) Field of Classification Search
USPC .............................................. 422/168; 60/274
See application file for complete search history.

(56) References Cited

U.S. PATENT DOCUMENTS

| | | | |
|---|---|---|---|
| 4,891,348 | A | 1/1990 | Imanari et al. |
| 5,087,600 | A | 2/1992 | Kato |
| 5,696,049 | A | 12/1997 | Ikeyama et al. |
| 6,027,697 | A | 2/2000 | Kurihara et al. |
| 7,256,155 | B2 | 8/2007 | Nojima et al. |
| 8,661,993 | B2 | 3/2014 | Kamiyama |
| 9,192,920 | B2 | 11/2015 | Nochi |
| 9,623,402 | B2 | 4/2017 | Masuda |
| 9,851,101 | B2 | 12/2017 | Masuda |
| 2004/0180783 | A1 | 9/2004 | Nojima et al. |
| 2011/0150731 | A1 | 6/2011 | Schermanz et al. |
| 2014/0080695 | A1 | 3/2014 | Nochi et al. |
| 2014/0271383 | A1 | 9/2014 | Marrino et al. |
| 2015/0224486 | A1 | 8/2015 | Bauer et al. |
| 2015/0246823 | A1 | 9/2015 | Yang et al. |
| 2016/0245511 | A1 | 8/2016 | Masuda et al. |
| 2016/0288094 | A1 | 10/2016 | Malmberg et al. |
| 2018/0085694 | A1 | 3/2018 | Imada |
| 2018/0272278 | A1 | 9/2018 | Kiyonaga et al. |
| 2018/0272318 | A1 | 9/2018 | Kiyonaga et al. |
| 2018/0280875 | A1 | 10/2018 | Kiyonaga et al. |
| 2018/0280936 | A1 | 10/2018 | Kiyonaga et al. |
| 2018/0280941 | A1 | 10/2018 | Kiyonaga et al. |
| 2018/0280965 | A1 | 10/2018 | Kiyonaga et al. |

FOREIGN PATENT DOCUMENTS

| | | |
|---|---|---|
| JP | S52-035786 A | 3/1977 |
| JP | S54-004873 A | 1/1979 |
| JP | S5466390 A | 5/1979 |
| JP | S56-168835 A | 12/1981 |
| JP | S59-032712 A | 2/1984 |
| JP | S59-049847 A | 3/1984 |
| JP | S59-217414 A | 12/1984 |
| JP | H04-225842 A | 8/1992 |
| JP | H06-277512 A | 10/1994 |
| JP | H07-060134 A | 3/1995 |
| JP | H07-241476 A | 9/1995 |
| JP | H09-103646 A | 4/1997 |
| JP | H11-253754 A | 9/1999 |
| JP | 2004-275852 A | 10/2004 |
| JP | 2005-342710 A | 12/2005 |
| JP | 2011-190940 A | 9/2011 |
| JP | 2012-047096 A | 3/2012 |
| JP | 2012-524646 A | 10/2012 |
| JP | 2014-065031 A | 4/2014 |
| JP | 2014-213293 A | 11/2014 |
| JP | 2015-530921 A | 10/2015 |
| JP | 2015-533766 A | 11/2015 |
| JP | 2016-513582 A | 5/2016 |
| JP | 2017-018919 A | 1/2017 |
| JP | 2017-503632 A | 2/2017 |
| JP | 6093101 B1 | 2/2017 |
| WO | WO 94/21373 A1 | 9/1994 |
| WO | WO2008/105469 A1 | 9/2008 |
| WO | WO 2014/143465 A1 | 9/2014 |
| WO | WO2015/110821 A1 | 7/2015 |
| WO | WO2017/042895 A1 | 3/2017 |

OTHER PUBLICATIONS

Shigeaki Kasaoka and Eiji Sasaoka, "Research of High Active Vanadium Oxides Catalysts for Low Temperature-Reduction of Nitrogen Oxides with Ammonia", *Environmental Conservation Engineering*, Aug. 7, 1979, pp. 676 to 684vol. 8, No. 7.

Makoto Mino et al., "NH3 Catalytic Selective Reduction At Low Temperatures of NO Using Vanadium Oxide", Dai 118 Kai CatSJ Meeting Toronkai A Yokoshu, Sep. 14, 2016 (Sep. 14, 2016), p. 435 (with English Language Translation).

Notification of Reasons for Refusal issued to JP Patent Application No. 2018-533851, dated Oct. 16, 2018.

Notification of Reasons for Refusal issued to JP Patent Application No. 2018-533706, dated Oct. 16, 2018.

Notification of Reasons for Refusal issued to JP Patent Application No. 2018-533852, dated Oct. 16, 2018.

Notification of Reasons for Refusal issued to JP Patent Application No. 2018-533707, dated Oct. 16, 2018.

United States Patent and Trademark Office, Office Action issued in the U.S. Appl. No. 15/764,234, filed Jan. 7, 2019, 7 pages.

Attached hereto is a Japanese Office Action dated Nov. 15, 2016 cited in corresponding application JP2016-560930, 3 pages. Additionally, an International Search Report dated May 23, 2017 cited in corresponding application PCT/JP2017/009050 was previously submitted in the present application dated Mar. 28, 2018.

U.S. Appl. No. 15/764,038, filed Mar. 28, 2018.
U.S. Appl. No. 15/764,200, filed Mar. 28, 2018.
U.S. Appl. No. 15/764,233, filed Mar. 28, 2018.
U.S. Appl. No. 15/764,077, filed Mar. 28, 2018.
U.S. Appl. No. 15/764,234, filed Mar. 28, 2018.
U.S. Appl. No. 15/764,209, filed Mar. 28, 2018.

(56) References Cited

OTHER PUBLICATIONS

U.S. Appl. No. 15/764,245, filed Mar. 28, 2018.
Office Action dated Sep. 27, 2019 issued in corresponding India Patent Application No. 201817011508 (with English language translation).
Office Action dated Oct. 30, 2019 in related U.S. Appl. No. 15/764,245, 7 pages.

COMBUSTION SYSTEM FOR SHIPS

TECHNICAL FIELD

The present invention relates to a combustion system for ships. More specifically, the present invention relates to a combustion system for ships that is used for ship propulsion and includes an internal combustion engine, an exhaust line through which exhaust gas flows, an exhaust heat recovery device that recovers exhaust heat from the exhaust gas, and a denitration device that removes nitrogen oxide from the exhaust gas.

BACKGROUND ART

In existing ships including an internal combustion engine, thermal energy is generated as a result of combustion of fuel such as petroleum in the internal combustion engine, and then the thermal energy is converted into a propulsive force of ships. The combustion of fuel in the internal combustion engine generates an exhaust gas containing nitrogen oxide.

The exhaust gas generated in the internal combustion engine is discharged to the outside from the internal combustion engine through an exhaust line. The exhaust gas basically contains nitrogen oxide and therefore environmental factors need to be considered. In this regard, for example, Patent Document 1 discloses a technique of removing, by using a denitration device, nitrogen oxide from exhaust gas discharged to the outside from an internal combustion engine of ships.

Patent Document 1: Japanese Unexamined Patent Application, Publication No. 2012-047096

DISCLOSURE OF THE INVENTION

Problems to be Solved by the Invention

In the technique disclosed in Patent Document 1, however, the possibility of poisoning increases as the temperature of exhaust gas in a denitration catalyst decreases, and thus exhaust gas discharged from an exhaust heat recovery system is heated using an electric heater before the exhaust gas is introduced into a denitration catalyst part. That is, the denitration catalyst is exposed to high temperature, which deteriorates the denitration catalyst. Consequently, the denitration catalyst is frequently replaced and the operation cost of the combustion system tends to increase.

In view of the foregoing, it is an object of the present invention to provide a combustion system operated at low cost.

Means for Solving the Problems

The present invention relates to a combustion system for ships that includes an internal combustion engine that burns fuel; an exhaust line through which exhaust gas flows, the exhaust gas being generated through combustion of the fuel in the internal combustion engine; an exhaust heat recovery device that is disposed in the exhaust line and that recovers exhaust heat from the exhaust gas discharged from the internal combustion engine; and a denitration device that is disposed in the exhaust line and that removes nitrogen oxide from the exhaust gas using a denitration catalyst, wherein the denitration device is disposed downstream from the exhaust heat recovery device in the exhaust line, and the denitration catalyst contains 43 wt % or more of vanadium pentoxide and has a BET specific surface area of 30 $m^2/g$ or more.

The exhaust heat recovery device preferably includes a turbine device and an exhaust gas economizer. The exhaust gas economizer preferably generates steam using, as heat sources, exhaust gas discharged from the internal combustion engine and exhaust gas supplied from the turbine device. The turbine device preferably generates electric power using the exhaust gas discharged from the internal combustion engine and the steam supplied from the exhaust gas economizer.

The electric power generated in the exhaust heat recovery device is preferably used to supplement motive power generated by the internal combustion engine.

The combustion system preferably further includes a dust collector that is disposed in the exhaust line and that collects dust in the exhaust gas. The dust collector is preferably disposed upstream from the denitration device in the exhaust line.

In the denitration catalyst, an amount of $NH_3$ desorbed by $NH_3$-TPD (TPD: temperature programed desorption) is preferably 10.0 μmol/g or more.

Effects of the Invention

Since the denitration catalyst used for the denitration device does not readily deteriorate, a combustion system operated at low cost can be provided.

PREFERRED MODE FOR CARRYING OUT
THE INVENTION

Figure 1:
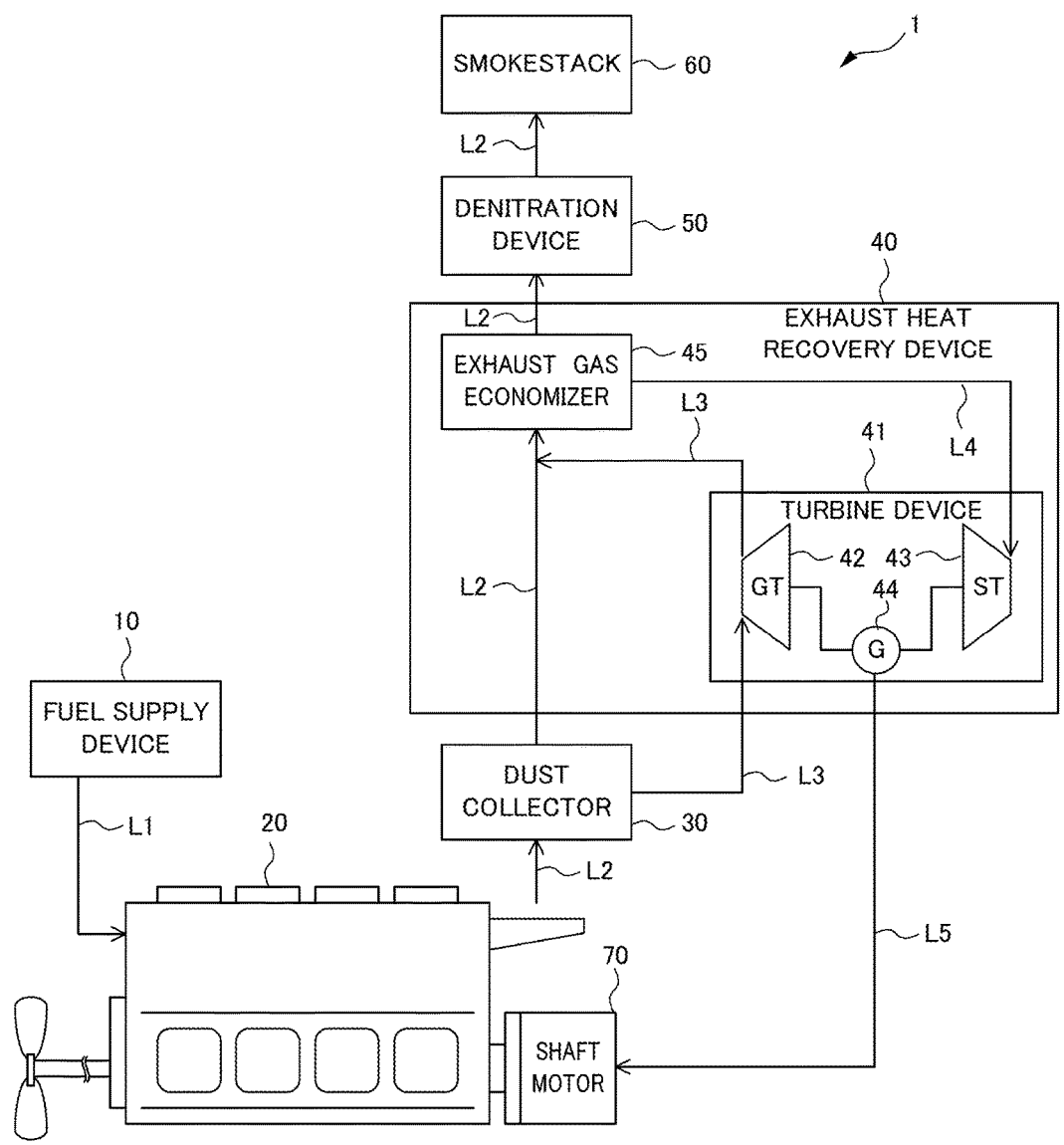
FIG. 1 illustrates a configuration of a combustion system according to an embodiment of the present invention.

Hereafter, embodiments of the present invention will be described with reference to the attached drawings. FIG. 1 illustrates a configuration of a combustion system 1 for ships according to this embodiment. As illustrated in FIG. 1, the combustion system 1 is a combustion system used for ship propulsion and includes a fuel supply device 10, an internal combustion engine 20 serving as a combustion device, a dust collector 30, an exhaust heat recovery device 40, a denitration device 50, a smokestack 60, a shaft motor 70, a fuel line L1, exhaust lines L2 and L3, a steam line L4, and a power line L5.

The fuel supply device 10 supplies fuel to the internal combustion engine 20 through the fuel line L1. The fuel may be, for example, a petroleum fuel such as light oil or heavy oil.

The fuel line L1 has an upstream portion connected to the fuel supply device 10 and a downstream portion connected to the internal combustion engine 20. The fuel line L1 is a flow path through which fuel is transported from the fuel supply device 10 to the internal combustion engine 20.

The internal combustion engine 20 burns a petroleum fuel together with air. In the internal combustion engine 20, the combustion of the petroleum fuel generates exhaust gas. The generated exhaust gas is discharged to the dust collector 30 through the exhaust line L2. The internal combustion engine 20 may be, for example, a two-stroke low speed diesel engine used for large ships, a four-stroke medium speed diesel engine used for ferries and the like, or a four-stroke high speed diesel engine used for high-speed boats and small boats.

The internal combustion engine 20 is connected to an upstream portion of the exhaust line L2. The exhaust line L2 is a flow path through which the exhaust gas generated in the internal combustion engine 20 flows.

The dust collector 30 is disposed downstream from the internal combustion engine 20 in the exhaust line L2. The exhaust gas discharged from the internal combustion engine 20 is supplied to the dust collector 30. The dust collector 30 is a device that collects dust in the exhaust gas. The dust may be collected by, for example, a method in which dust is charged by applying voltage to electrodes and collected using the Coulomb force. Alternatively, the dust may be collected by a method that uses a venturi scrubber. In this method, a dust absorbing liquid is supplied to a venturi section and atomized by exhaust gas that flows at high speed at this venturi section, so that the dust is collected through gas-liquid contact.

The exhaust heat recovery device 40 is disposed downstream from the dust collector 30 in the exhaust line. The exhaust gas from which dust has been removed in the dust collector 30 is supplied to the exhaust heat recovery device 40. The exhaust heat recovery device 40 recovers exhaust heat from the exhaust gas supplied from the dust collector 30. More specifically, the exhaust heat recovery device 40 includes a turbine device 41 and an exhaust gas economizer 45.

The turbine device 41 includes a gas turbine 42, a steam turbine 43, and a generator 44. The gas turbine 42 and the generator 44 are connected to each other, and the steam turbine 43 and the generator 44 are connected to each other. The gas turbine 42 is driven by exhaust gas supplied from the dust collector 30 through the exhaust line L3. When the gas turbine 42 is driven, the generator 44 connected to the gas turbine 42 is also driven together and thus electric power is generated. The steam turbine 43 is driven by steam supplied from the exhaust gas economizer 45 describe later through the steam line L4. When the steam turbine 43 is driven, the generator 44 connected to the steam turbine 43 is also driven together and thus electric power is generated. The electric power generated by the generator 44 is supplied to the shaft motor 70 through the power line L5.

The exhaust gas economizer 45 generates steam from water stored in a feed tank (not illustrated) using, as heat sources, exhaust gas supplied from the dust collector 30 through the exhaust line L2 and exhaust gas supplied from the gas turbine 42 through the exhaust line L3. The steam generated by the exhaust gas economizer 45 is supplied to the steam turbine 43 through the steam line L4.

The exhaust line L3 is an exhaust line different from the exhaust line L2 and has an upstream portion connected to the dust collector 30 and a downstream portion connected to the exhaust gas economizer 45. The exhaust line L3 extends via the gas turbine 42. The exhaust line L3 is a flow path through which exhaust gas supplied from the dust collector 30 flows to the exhaust gas economizer 45 via the gas turbine 42.

The steam line L4 has an upstream portion connected to the exhaust gas economizer 45 and a downstream portion connected to the steam turbine 43. The steam line L4 is a flow path through which steam generated in the exhaust gas economizer 45 flows.

The power line L5 has an upstream portion connected to the generator 44 and a downstream portion connected to the shaft motor 70. The power line is a flow path through which electric power generated in the generator 44 is transmitted.

The denitration device 50 is disposed downstream from the exhaust heat recovery device 40 in the exhaust line L2. The exhaust gas from which exhaust heat has been collected is supplied to the denitration device 50. The denitration device 50 removes nitrogen oxide from the exhaust gas using a denitration catalyst. The denitration catalyst used in the denitration device 50 will be specifically described later. Since the denitration device 50 is disposed downstream from the exhaust heat recovery device 40, the temperature of the exhaust gas in the denitration device 50 is, for example, 130° C. to 200° C.

In the denitration device 50, nitrogen oxide is removed from the exhaust gas by a selective catalytic reduction method. In the selective catalytic reduction method, nitrogen and water are generated from nitrogen oxide by using a reducing agent and a denitration catalyst. Thus, nitrogen oxide can be efficiently removed from the exhaust gas. The reducing agent used in the selective catalytic reduction method contains at least one of ammonia and urea. When ammonia is used as a reducing agent, ammonia in any state, such as ammonia gas, liquid ammonia, or an aqueous ammonia solution, may be used.

More specifically, the denitration device 50 may have the following mechanism. Ammonia gas is injected to the introduced exhaust gas and then the mixed gas is brought into contact with the denitration catalyst.

The smokestack 60 is connected to a downstream portion of the exhaust line L2. The exhaust gas from which nitrogen oxide has been removed in the denitration device 50 is introduced into the smokestack 60. The temperature of the exhaust gas in the denitration device 50 is, for example, 130° C. to 200° C. Therefore, the exhaust gas introduced into the smokestack 60 is effectively discharged from the upper part of the smokestack 60 because of a stack effect. Furthermore, the generation of white smoke due to condensation of water vapor can be prevented above the smokestack 60. The temperature of the exhaust gas near the outlet of the smokestack 60 is, for example, 110° C.

The shaft motor 70 is disposed downstream from the generator 44 in the power line L5 and is driven so as to assist the rotation of a propeller shaft of the internal combustion engine 20. Electric power is supplied from the generator 44 to the shaft motor 70 through the power line L5. The shaft motor 70 is driven with the electric power so as to supplement the motive power generated by the internal combustion engine 20.

Next, the denitration catalyst used in the denitration device 50 will be described. The denitration catalyst of the present invention contains 43 wt % or more of vanadium pentoxide and has a BET specific surface area of 30 m$^2$/g or more. Such a denitration catalyst can exhibit a high denitration effect even in a low-temperature environment compared with known denitration catalysts such as a vanadium/titanium catalyst.

Specifically, when a denitration catalyst containing 3.3 wt % or more of vanadium oxide in terms of vanadium pentoxide is used in a selective catalytic reduction reaction (NH$_3$-SCR) that uses ammonia as a reducing agent, the NO conversion ratio is approximately 35% or more at a reaction temperature of 120° C. and approximately 60% or more at a reaction temperature of 150° C. Even at a reaction temperature of 100° C., the NO conversion ratio exceeds 20%. In contrast, if the denitration catalyst contains only less than 3.3 wt % of vanadium oxide in terms of vanadium pentoxide, the NO conversion ratio is less than 20% at a reaction temperature of 120° C. and even at a reaction temperature of 150° C.

As described above, the denitration catalyst according to the present invention contains 43 wt % or more of vanadium oxide in terms of vanadium pentoxide, and may also contain titanium oxide as another component in addition to the vanadium oxide. Furthermore, a noble metal, a base metal, and a main group metal may be contained. Preferably, for example, tungsten oxide, chromium oxide, and molybdenum oxide can also be contained.

It has been described that the denitration catalyst contains 43 wt % or more of vanadium oxide in terms of vanadium pentoxide. Preferably, the denitration catalyst may contain 80 wt % or more of vanadium oxide in terms of vanadium pentoxide. More preferably, the content of vanadium oxide in the denitration catalyst may be 100%.

The above-described vanadium oxide includes vanadium (II) oxide (VO), vanadium(III) trioxide (V$_2$O$_3$), vanadium (IV) dioxide (V$_2$O$_4$), and vanadium(V) pentoxide (V$_2$O$_5$), and the V element in vanadium pentoxide (V$_2$O$_5$) may have a pentavalent, tetravalent, trivalent, or divalent form in the denitration reaction.

Regarding the BET specific surface area of the denitration catalyst, for example, in the NH$_3$-SCR that is performed at a reaction temperature of 120° C. using a denitration catalyst containing vanadium pentoxide and having a BET specific surface area of 13.5 m$^2$/g, the NO conversion ratio exceeds 20%. Even in the NH$_3$-SCR that is performed at a reaction temperature of 120° C. using a denitration catalyst containing vanadium pentoxide and having a BET specific surface area of 16.6 m$^2$/g, the NO conversion ratio exceeds 20%. In contrast, in the NH$_3$-SCR that is performed at a reaction temperature of 120° C. using, for example, a denitration catalyst having a BET specific surface area of 4.68 m$^2$/g, which is a denitration catalyst having a BET specific surface area of less than 10 m$^2$/g, the NO conversion ratio falls below 20%.

The BET specific surface area of the denitration catalyst is 10 m$^2$/g or more and may be preferably 15 m$^2$/g or more. More preferably, the BET specific surface area of the denitration catalyst may be 30 m$^2$/g. More preferably, the BET specific surface area of the denitration catalyst may be 40 m$^2$/g or more. More preferably, the BET specific surface area of the denitration catalyst may be 50 m$^2$/g or more. More preferably, the BET specific surface area of the denitration catalyst may be 60 m$^2$/g or more.

The BET specific surface area of the denitration catalyst is preferably measured in conformity with the conditions specified in JIS Z 8830:2013. Specifically, the BET specific surface area can be measured by a method described in Examples below.

The denitration catalyst of the present invention is used for denitration at 200° C. or lower. Preferably, the denitration catalyst is used for denitration at 160° C. or higher and 200° C. or lower. Thus, oxidation of SO$_2$ into SO$_3$ does not occur during the NH$_3$-SCR reaction.

Regarding the amount of NH$_3$ desorbed by NH$_3$-TPD (TPD: temperature programed desorption), when the amount of NH$_3$ desorbed exceeds 10.0 µmol/g, the NO conversion ratio of the denitration catalyst in the NH$_3$-SCR at a reaction temperature of 120° C. is 20% or more. In contrast, when the amount of NH$_3$ desorbed falls below 10.0 µmol/g, the NO conversion ratio of the denitration catalyst in the NH$_3$-SCR at a reaction temperature of 120° C. falls below 20%.

In the denitration catalyst of the present invention, the amount of NH$_3$ desorbed by NH$_3$-TPD (TPD: temperature programed desorption) is 10.0 µmol/g or more. Preferably, the amount of NH$_3$ desorbed by NH$_3$-TPD may be 20.0 µmol/g or more. More preferably, the amount of NH$_3$ desorbed by NH$_3$-TPD may be 50.0 µmol/g or more. More preferably, the amount of NH$_3$ desorbed by NH$_3$-TPD may be 70.0 µmol/g or more.

The denitration catalyst containing 3.3 wt % or more of vanadium oxide in terms of vanadium pentoxide and having a BET specific surface area of 10 m$^2$/g or more can be produced by any of a thermal decomposition process, a sol-gel process, and an impregnation process. Hereafter, a method for producing the denitration catalyst containing 3.3 wt % or more of vanadium pentoxide and having a specific surface area of 10 m$^2$/g or more by a thermal decomposition process, a sol-gel process, or an impregnation process will be described.

The thermal decomposition process includes a step of thermally decomposing a vanadate. Examples of the vanadate that may be used include ammonium vanadate, magnesium vanadate, strontium vanadate, barium vanadate, zinc vanadate, tin vanadate, and lithium vanadate.

In the thermal decomposition process, the vanadate is preferably thermally decomposed at 300° C. to 400° C.

The sol-gel process includes a step of dissolving a vanadate in a chelate compound, performing drying, and performing firing. Examples of the chelate compound that may be used include compounds having a plurality of carboxy groups, such as oxalic acid and citric acid; compounds having a plurality of amino groups, such as acetylacetonate and ethylenediamine; and compounds having a plurality of hydroxy groups, such as ethylene glycol.

The sol-gel process preferably includes a step of dissolving a vanadate in a chelate compound such that the molar ratio of vanadium and the chelate compound is, for example, 1:1 to 1:5, though this is dependent on the chelate compound. Preferably, the molar ratio of the vanadate and the chelate compound may be 1:2 to 1:4.

The impregnation process includes a step of dissolving a vanadate in a chelate compound, adding a carrier, performing drying, and then performing firing. Examples of the carrier that may be used include titanium oxide, aluminum oxide, and silica. As above, examples of the chelate compound that may be used include compounds having a plurality of carboxy groups, such as oxalic acid and citric acid; compounds having a plurality of amino groups, such as acetylacetonate and ethylenediamine; and compounds having a plurality of hydroxy groups, such as ethylene glycol.

In the impregnation process, x wt % $V_2O_5/TiO_2$ (x≥43) may be produced as a denitration catalyst according to an embodiment of the present invention by, for example, dissolving ammonium vanadate in an oxalic acid solution, adding titanium oxide ($TiO_2$) serving as a carrier, performing drying, and then performing firing.

The thus-produced denitration catalyst normally contains 3.3 wt % or more of vanadium pentoxide and has a specific surface area of 10 $m^2/g$ or more.

The denitration catalyst used in the denitration device 50 of the combustion system 1 may be a honeycomb-type catalyst obtained by coating a honeycomb-shaped substrate with a powder of the above-described denitration catalyst or a catalyst baked in a block shape using the above-described denitration catalyst as a catalyst component. The catalyst block may have any shape other than the honeycomb shape, such as a plate-like shape, a pellet shape, a fluid shape, a columnar shape, a star shape, a ring shape, an extruded shape, a spherical shape, a flake shape, a pastille shape, a ribbed extruded shape, or a ribbed ring shape. For example, the honeycomb surface of the honeycomb-shaped catalyst block may have a polygonal shape such as a triangle, a quadrilateral, a pentagon, or a hexagon or a circular shape.

The combustion system 1 according to the above embodiment produces the following effects. (1) The combustion system 1 according to the above embodiment is a combustion system including an exhaust line through which exhaust gas flows, the exhaust gas being generated through combustion of fuel in an internal combustion engine, an exhaust heat recovery device that is disposed in the exhaust line and that recovers exhaust heat from the exhaust gas discharged from the internal combustion engine, and a denitration device that is disposed in the exhaust line and that removes nitrogen oxide from the exhaust gas using a denitration catalyst. The denitration device is disposed downstream from the exhaust heat recovery device in the exhaust line, and the denitration catalyst contains 43 wt % or more of vanadium pentoxide and has a BET specific surface area of 30 $m^2/g$ or more. Since the denitration catalyst according to the above embodiment can be used for denitration at 200° C. or lower, the denitration device can be disposed downstream from the exhaust heat recovery device. Furthermore, the exhaust gas is not necessarily heated immediately before the exhaust gas is introduced into the denitration device. Thus, the denitration catalyst is not exposed to high temperature, which suppresses the deterioration of the denitration catalyst and reduces the operation cost of the combustion system. The combustion system according to the above embodiment does not necessarily include a heater for heating the exhaust gas and thus has a compact configuration. Therefore, the combustion system including a denitration device can be installed into a small space in ships.

(2) As described above, the exhaust heat recovery device preferably includes a turbine device and an exhaust gas economizer. The exhaust gas economizer preferably generates steam using, as heat sources, exhaust gas discharged from the internal combustion engine and exhaust gas supplied from the turbine device. The turbine device preferably generates electric power using the exhaust gas discharged from the internal combustion engine and the steam supplied from the exhaust gas economizer. The exhaust heat recovery device according to the above embodiment includes the turbine device and the exhaust gas economizer, and therefore the thermal energy generated through combustion of fuel in the internal combustion engine can be more effectively utilized.

(3) As described above, the electric power generated in the exhaust heat recovery device is preferably used to supplement motive power generated by the internal combustion engine. Thus, by supplementing motive power generated by the internal combustion engine using electric power generated through recovery of the exhaust heat, the amount of fuel used in the internal combustion engine can be economized.

(4) As described above, the combustion system preferably further includes a dust collector that is disposed in the exhaust line and that collects dust in the exhaust gas. The dust collector is preferably disposed upstream from the denitration device in the exhaust line. Since the denitration catalyst according to the above embodiment can be used for denitration at 200° C. or lower, the denitration device can be disposed downstream from the dust collector. A relatively clean exhaust gas containing only a small amount of ash is introduced into the denitration device, which suppresses the deterioration of the denitration catalyst and reduces the operation cost of the combustion system.

(5) As described above, in the denitration catalyst, an amount of $NH_3$ desorbed by $NH_3$-TPD (TPD: temperature programed desorption) is preferably 10.0 μmol/g or more. When this denitration catalyst is used in the $NH_3$-SCR at a reaction temperature of 120° C., the NO conversion ratio exceeds 20%.

The present invention is not limited to the above embodiment, and any of modifications, improvements, and the like are included in the present invention as long as the object of the present invention is achieved.

It has been described in the above embodiment that the denitration device 50 removes nitrogen oxide from the exhaust gas by a selective catalytic reduction method. However, the present invention is not limited thereto. For example, in the present invention, the denitration device 50 may remove nitrogen oxide from the exhaust gas by a non-selective catalytic reduction method.

It has been described in the above embodiment that the exhaust heat recovery device 40 includes the turbine device 41 and the exhaust gas economizer 45. However, the present invention is not limited thereto. For example, the exhaust heat recovery device 40 does not include the exhaust gas economizer 45 and the turbine device 41 does not include the steam turbine 43, and the gas turbine 42 may be driven by only exhaust gas from the dust collector 30. Alternatively, the turbine device 41 does not include the gas turbine 42, and the steam turbine 43 may be driven by only steam supplied from the exhaust gas economizer 45.

It has been described in the above embodiment that the dust collector 30 is disposed between the internal combustion engine 20 and the exhaust heat recovery device 40. However, the present invention is not limited thereto. For example, the dust collector 30 may be omitted to achieve a compact configuration of the combustion system 1.

It has been described in the above embodiment that the electric power generated in the generator 44 of the turbine device 41 is used for driving the shaft motor 70. However, the present invention is not limited thereto. For example, the electric power may be supplied to various devices in a ship, such as a communication device, a lighting device, an electric heating device, a nautical instrument, and residential facilities.

EXAMPLES

Hereafter, Examples of the denitration catalyst of the present invention will be specifically described together with Reference Examples and Comparative Examples. The present invention is not limited by Examples.

1. Relationship Between Vanadium Oxide Content and Specific Surface Area and $NH_3$-SCR Activity 1.1 Examples and Comparative Examples Reference Example 1

Ammonium vanadate ($NH_4VO_3$) was thermally decomposed in the air at 300° C. for 4 hours to obtain vanadium pentoxide ($V_2O_5$). The obtained vanadium pentoxide was used as a denitration catalyst in Reference Example 1. The sample name of the denitration catalyst in Reference Example 1 was "$V_2O_5\_300$".

Reference Example 2

Ammonium vanadate was thermally decomposed in the air at 400° C. for 4 hours to obtain vanadium pentoxide. The obtained vanadium pentoxide was used as a denitration catalyst in Reference Example 2. The sample name of the denitration catalyst in Reference Example 2 was "$V_2O_5\_400$".

Comparative Example 1

Ammonium vanadate was thermally decomposed in the air at 500° C. for 4 hours to obtain vanadium pentoxide. The obtained vanadium pentoxide was used as a denitration catalyst in Comparative Example 1. The sample name of the denitration catalyst in Comparative Example 1 was "$V_2O_5\_500$".

Example 1

Ammonium vanadate was dissolved in an oxalic acid solution (molar ratio of vanadium:oxalic acid=1:3). After ammonium vanadate was completely dissolved, water in the solution was evaporated on a hot stirrer, and drying was performed in a dryer at 120° C. for one night. Then, the dried powder was fired in the air at 300° C. for 4 hours. The vanadium pentoxide after firing was used as a denitration catalyst in Example 1. The sample name of the denitration catalyst in Example 1 obtained by this sol-gel process was "$V_2O_5\_SG\_300$". Denitration catalysts obtained at different molar ratios of vanadium and oxalic acid when ammonium vanadate is dissolved in an oxalic acid solution will be described later.

Comparative Example 2

Ammonium vanadate was added to an oxalic acid solution and stirred for 10 minutes, and titanium oxide serving as a carrier was gradually added. Then, water in the solution was evaporated on a hot stirrer and drying was performed in a dryer at 120° C. for one night. Subsequently, the dried powder was fired in the air at 300° C. for 4 hours. As a result, the denitration catalyst after firing that contained 0.3 wt % of vanadium pentoxide was used as a denitration catalyst in Comparative Example 2. The sample name of the denitration catalyst in Comparative Example 2 was "0.3 wt % $V_2O_5/TiO_2$".

Comparative Example 3

The denitration catalyst after firing that was obtained by the same method as in Comparative Example 2 and contained 0.9 wt % of vanadium pentoxide was used as a denitration catalyst in Comparative Example 3. The sample name of the denitration catalyst in Comparative Example 3 was "0.9 wt % $V_2O_5/TiO_2$".

Reference Example 3

The denitration catalyst after firing that was obtained by the same method as in Comparative Example 2 and contained 3.3 wt % of vanadium pentoxide was used as a denitration catalyst in Reference Example 3. The sample name of the denitration catalyst in Reference Example 3 was "3.3 wt % $V_2O_5/TiO_2$".

Reference Example 4

The denitration catalyst after firing that was obtained by the same method as in Comparative Example 2 and contained 9 wt % of vanadium pentoxide was used as a denitration catalyst in Reference Example 4. The sample name of the denitration catalyst in Reference Example 4 was "9 wt % $V_2O_5/TiO_2$".

Reference Example 5

The denitration catalyst after firing that was obtained by the same method as in Comparative Example 2 and contained 20 wt % of vanadium pentoxide was used as a denitration catalyst in Reference Example 5. The sample name of the denitration catalyst in Reference Example 5 was "20 wt % $V_2O_5/TiO_2$".

Reference Example 6

The denitration catalyst after firing that was obtained by the same method as in Comparative Example 2 and contained 33 wt % of vanadium pentoxide was used as a denitration catalyst in Reference Example 6. The sample name of the denitration catalyst in Reference Example 6 was "33 wt % $V_2O_5/TiO_2$".

Example 2

The denitration catalyst after firing that was obtained by the same method as in Comparative Example 2 and contained 43 wt % of vanadium pentoxide was used as a denitration catalyst in Example 2. The sample name of the denitration catalyst in Example 2 was "43 wt % $V_2O_5/TiO_2$".

Example 3

The denitration catalyst after firing that was obtained by the same method as in Comparative Example 2 and contained 80 wt % of vanadium pentoxide was used as a denitration catalyst in Example 3. The sample name of the denitration catalyst in Example 3 was "80 wt % $V_2O_5/TiO_2$".

Comparative Example 4

An existing catalyst was used in Comparative Example 4. The existing catalyst is a catalyst in which, for example, tungsten oxide ($WO_3$) (content: 10.72 wt %) and silica ($SiO_2$) (content: 6.25 wt %) are supported on titanium oxide ($TiO_2$) (content: 79.67 wt %) and which contains about 0.5% of vanadium.

1.2 Evaluation

1.2.1 Powder X-Ray Diffraction (Diffraction Method)

Powder X-ray diffraction analysis was performed with a Rigaku smart lab using Cu-Ka.

(Diffraction Result)

Figure 2:
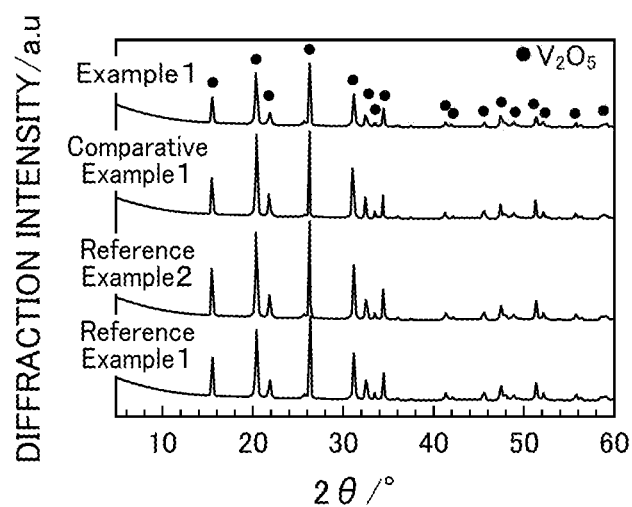
FIG. 2 illustrates the powder X-ray diffraction results of vanadium pentoxide catalysts produced in Example 1, Reference Examples 1 and 2, and Comparative Example 1.
Figure 3:
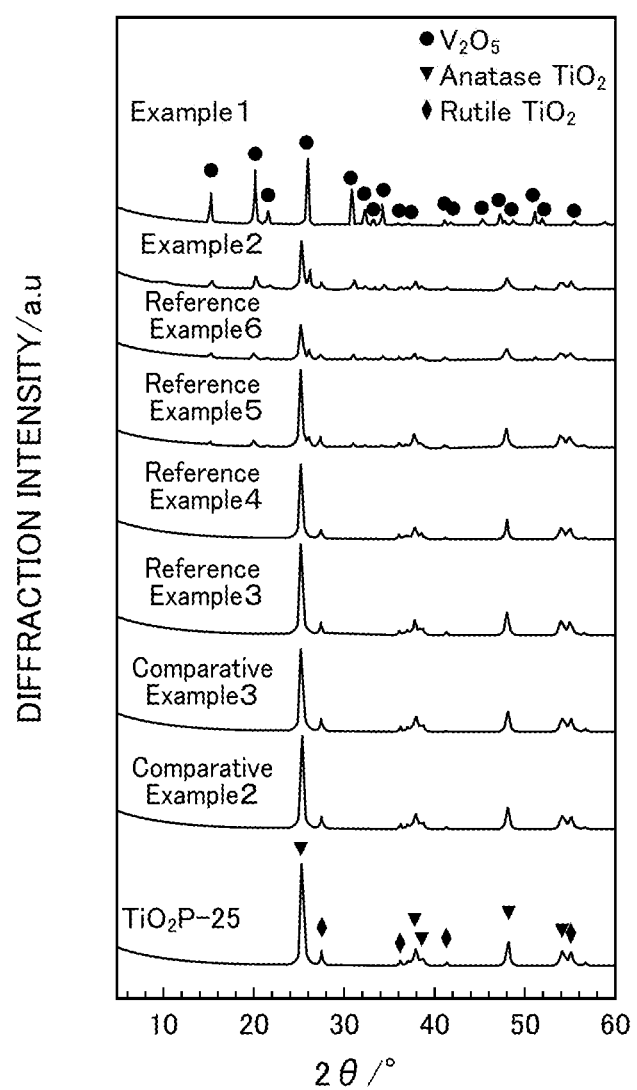
FIG. 3 illustrates the powder X-ray diffraction results of vanadium pentoxide catalysts produced in Examples 1 and 2, Reference Examples 3 to 6, and Comparative Examples 2 and 3.

FIG. 2 illustrates powder XRD patterns of Example 1 ($V_2O_5$_SG_300), Reference Example 1 ($V_2O_5$_300), Reference Example 2 ($V_2O_5$_400), and Comparative Example 1 ($V_2O_5$_500). FIG. 3 illustrates powder XRD patterns of Example 1 ($V_2O_5$_SG_300) and Example 2, Reference Examples 3 to 6, and Comparative Examples 2 and 3 (x wt % $V_2O_5/TiO_2$). In the powder XRD patterns of Example 1 ($V_2O_5$_SG_300), Reference Example 1 ($V_2O_5$_300), Reference Example 2 ($V_2O_5$_400), and Comparative Example 1 ($V_2O_5$_500), only peaks for $V_2O_5$ were observed regardless of the thermal decomposition temperature and the production method. In the powder XRD patterns of Example 2, Reference Examples 3 to 6, and Comparative Examples 2 and 3 (x wt % $V_2O_5/TiO_2$), peaks for $V_2O_5$ were not observed at 9 wt % or less and thus $V_2O_5$ is believed to be highly dispersed in $TiO_2$. When the amount of $V_2O_5$ supported was increased to 20 wt %, peaks for $V_2O_5$ were observed at 22.20 and 27.4°, and the $V_2O_5$ peak intensity increased as the amount of $V_2O_5$ supported was increased. On the other hand, the $TiO_2$ peak intensity tended to decrease.

1.2.2 Measurement of BET Specific Surface Area (Measurement Method)

The BET specific surface area was measured with a MicrotracBEL BELSORP-max. Pretreatment was performed in an Ar atmosphere at 200° C. for 2 hours, and then measurement was performed at 196° C.

(Measurement Result)

TABLE 1

BET specific surface area of vanadium pentoxide catalyst

| Sample | | BET specific surface area/$m^2g^{-1}$ |
|---|---|---|
| Reference Example1 | ($V_2O_5$_300) | 16.6 |
| Reference Example2 | ($V_2O_5$_400) | 13.5 |
| Comparative Example1 | ($V_2O_5$_500) | 4.68 |
| Example1 | ($V_2O_5$_SG_300) | 62.9 |
| Comparative Example2 | (0.3 wt % $V_2O_5/TiO_2$) | 62.8 |
| Comparative Example3 | (0.9 wt % $V_2O_5/TiO_2$) | 59 |
| Reference Example3 | (3.3 wt % $V_2O_5/TiO_2$) | 55.4 |
| Reference Example4 | (9 wt % $V_2O_5/TiO_2$) | 54.6 |
| Reference Example5 | (20 wt % $V_2O_5/TiO_2$) | 48.3 |
| Reference Example6 | (33 wt % $V_2O_5/TiO_2$) | 41.2 |
| Example2 | (43 wt % $V_2O_5/TiO_2$) | 49.4 |
| Example3 | (80 wt % $V_2O_5/TiO_2$) | 34 |
| Comparative Example4 | (Existing catalyst) | 61.8 |

Table 1 shows BET specific surface areas of Reference Example 1 ($V_2O_5$_300), Reference Example 2 ($V_2O_5$_400), Comparative Example 1 ($V_2O_5$_500), Example 1 ($V_2O_5$_SG_300), Comparative Examples 2 and 3, Reference Examples 3 to 6, and Examples 2 and 3 (x wt % $V_2O_5/TiO_2$ catalyst), and Comparative Example 4 (existing catalyst). In the vanadium pentoxide catalysts obtained by thermally decomposing ammonium vanadate, the BET specific surface area decreased with increasing the thermal decomposition temperature. That is, the vanadium pentoxide in Reference Example 1 ($V_2O_5$_300) in which the thermal decomposition was performed at 300° C. had a maximum BET specific surface area of 16.6 $m^2g^{-1}$. The vanadium pentoxide obtained at 300° C. through a sol-gel process had a larger BET specific surface area of 62.9 $m^2g^{-1}$. In Reference Examples 3 to 6, Examples 2 and 3, and Comparative Examples 2 and 3 (x wt % $V_2O_5/TiO_2$), as the amount of vanadium pentoxide supported was increased, pores in $TiO_2$ were filled and the BET specific surface area decreased.

1.2.3 Measurement of Catalytic Activity (Measurement Method)

An $NH_3$-SCR reaction was performed using a fixed-bed flow reactor under the conditions listed in Table 2 below. Among gases that had passed through the catalytic layer, NO, $NH_3$, $NO_2$, and $N_2O$ were analyzed with a Jasco FT-IR-4700.

TABLE 2

$NH_3$-SCR measurement conditions

| | |
|---|---|
| Amount of catalyst | 0.375 mg |
| Gas flow rate | 250 mLmin$^{-1}$ |
| | (NO: 250 ppm, $NH_3$: 250 ppm, $O_2$: 4 vol %) |
| | (2000 ppm NO/Ar 31.3 mL min$^{-1}$) |
| | (2000 ppm $NH_3$/Ar 31.3 mL min$^{-1}$) |
| | ($O_2$ 14 mL min$^{-1}$) |
| | (Ar 177.4 mL min$^{-1}$) |
| Space velocity | 40,000 mLh$^{-1}$g$_{cat}^{-1}$ |

Furthermore, the NO conversion ratio and the $N_2$ selectivity were calculated from formulae below. Herein, $NO_{in}$ represents a NO concentration at an inlet of a reaction tube, $NO_{out}$ represents a NO concentration at an outlet of the reaction tube, $N_{2out}$ represents a $N_2$ concentration at the outlet of the reaction tube, $NH_{3in}$ represents an $NH_3$ concentration at the inlet of the reaction tube, and $NH_{3out}$ represents an $NH_3$ concentration at the outlet of the reaction tube.

$$\text{NO CONVERSION RATIO} = \frac{NO_{in} - NO_{out}}{NO_{in}} \times 100 \quad \text{[Formula 1]}$$

$$N_2 \text{ SELECTIVITY } (\%) = \quad \text{[Formula 2]}$$
$$\frac{2 * N_{2out}}{(NO_{in} + NH_{3in}) - (NO_{out} + NH_{3out})} \times 100$$

$$(2 * N_{2out} = (NO_{in} + NH_{3in}) -$$
$$(NO_{out} + NH_{3out} + NO_{2out} + 2 * N_2O_{out}))$$

(Measurement Result)

Figure 4:
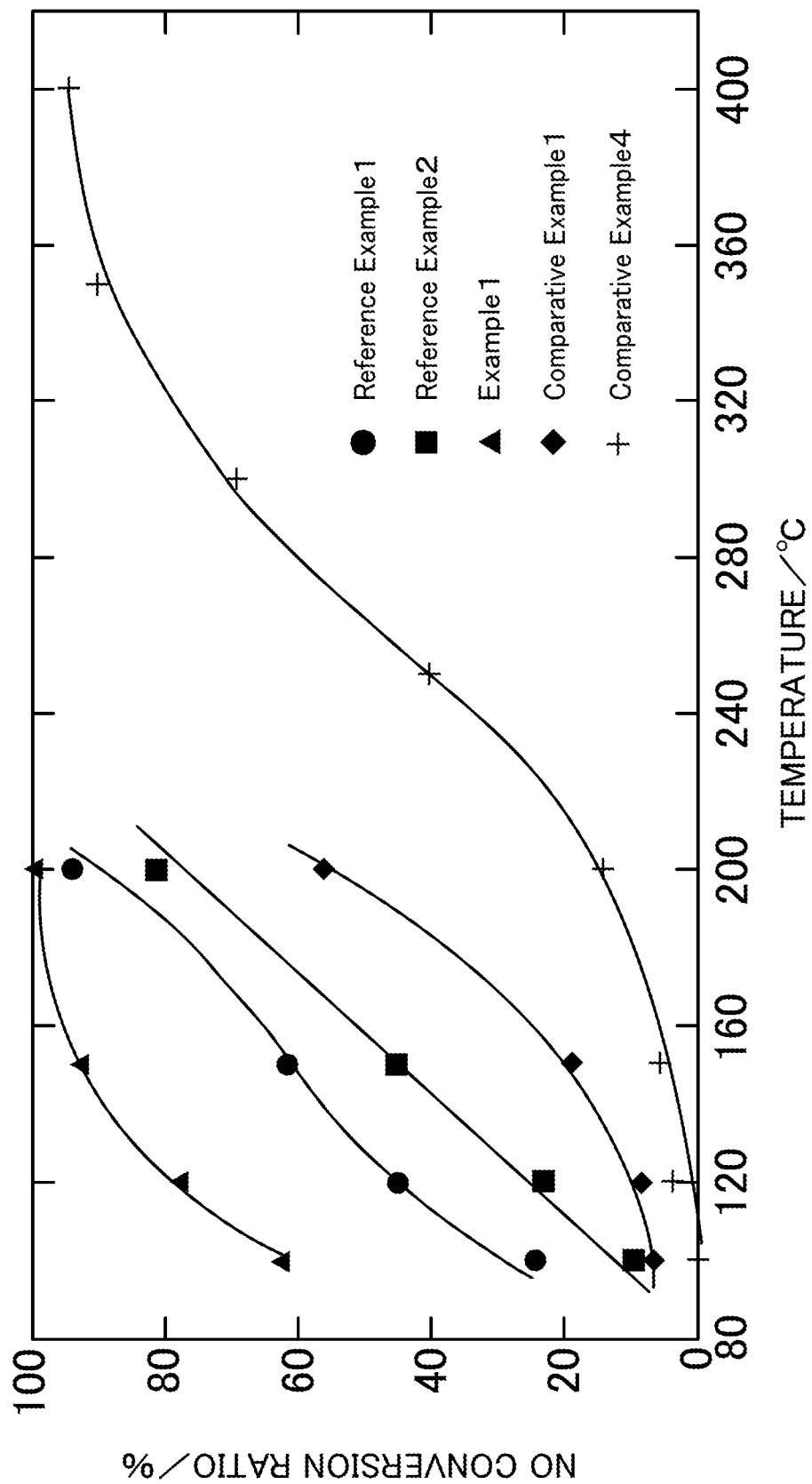
FIG. 4 illustrates the $NH_3$-SCR activity of vanadium pentoxide catalysts produced in Example 1, Reference Examples 1 and 2, and Comparative Examples 1 and 4.

FIG. 4 illustrates the $NH_3$-SCR activity of the vanadium pentoxide catalysts. In the case of the catalysts obtained by thermally decomposing ammonium vanadate, the NO conversion ratio increased as the thermal decomposition temperature was decreased. The highest activity was exhibited in Reference Example 1 ($V_2O_5$_300° C.) in which the catalyst was obtained at a thermal decomposition temperature of 300° C. At a reaction temperature of 200° C., a NO conversion ratio of 80% or more was achieved when any of the catalysts in Reference Example 1 ($V_2O_5$_300° C.), Reference Example 2 ($V_2O_5$_400° C.), and Example 1 ($V_2O_5$_SG_300° C.) was used. Furthermore, the NO conversion ratio was higher in any of Examples than in Comparative Example 1 and Comparative Example 4.

The specific surface area of the vanadium pentoxide increases as the thermal decomposition temperature is decreased. Therefore, it is believed that the low-temperature $NH_3$-SCR activity that uses a bulk vanadium pentoxide catalyst is attributable to the BET specific surface area. Hence, as described above, the vanadium pentoxide was produced through a sol-gel process that uses oxalic acid in order to increase the BET specific surface area in Example 1. The BET specific surface area of the vanadium pentoxide produced through this process is 62.9 $m^2g^{-1}$ as shown in Table 1, which is about four times larger than the BET specific surface areas of the vanadium pentoxides produced through a thermal decomposition process. The NO conversion ratio in Example 1 ($V_2O_5$_SG_300° C.) was increased by 80% to 200% at 100° C. to 150° C. compared with the vanadium pentoxides produced through a thermal decomposition process.

Figure 5:
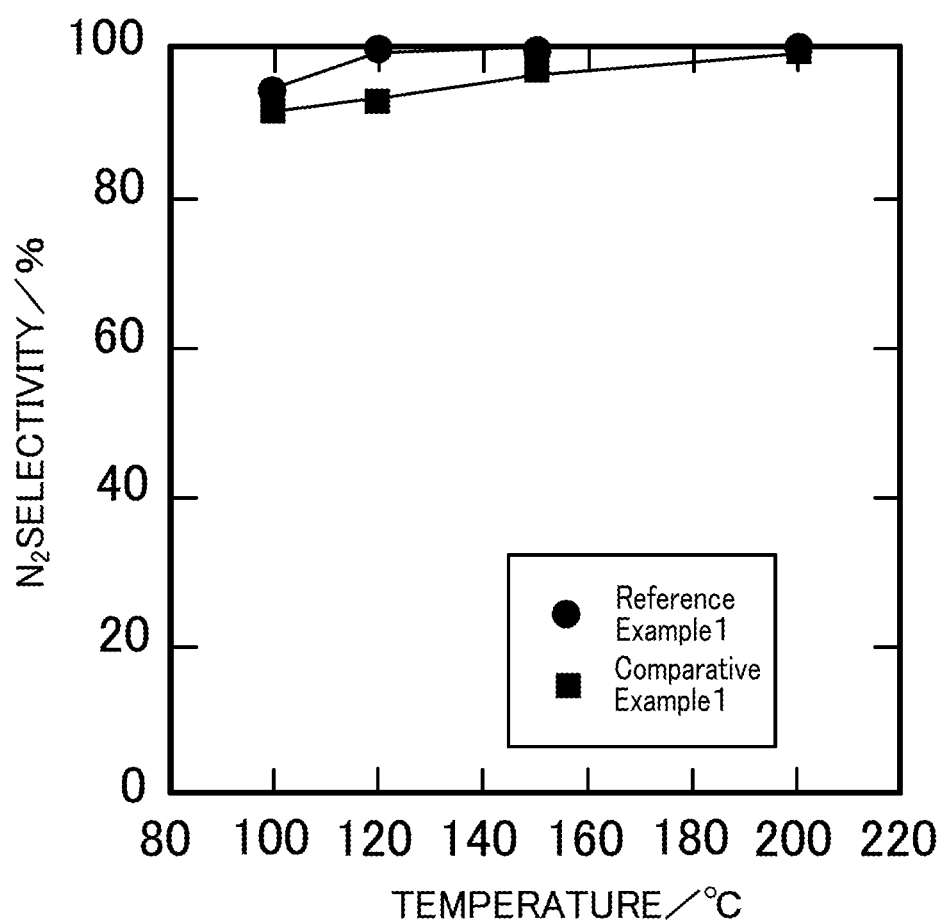
FIG. 5 illustrates the relationship between the reaction temperature and the $N_2$ selectivity in a selective catalytic reduction reaction that uses vanadium pentoxide catalysts produced in Reference Example 1 and Comparative Example 1.

The $N_2$ selectivity was almost 100% at any temperature. FIG. 5 illustrates, as examples, the $N_2$ selectivities in Reference Example 1 ($V_2O_5$_300° C.) and Comparative Example 1 ($V_2O_5$_500° C.).

(Space Velocity Dependency)

Figure 6:
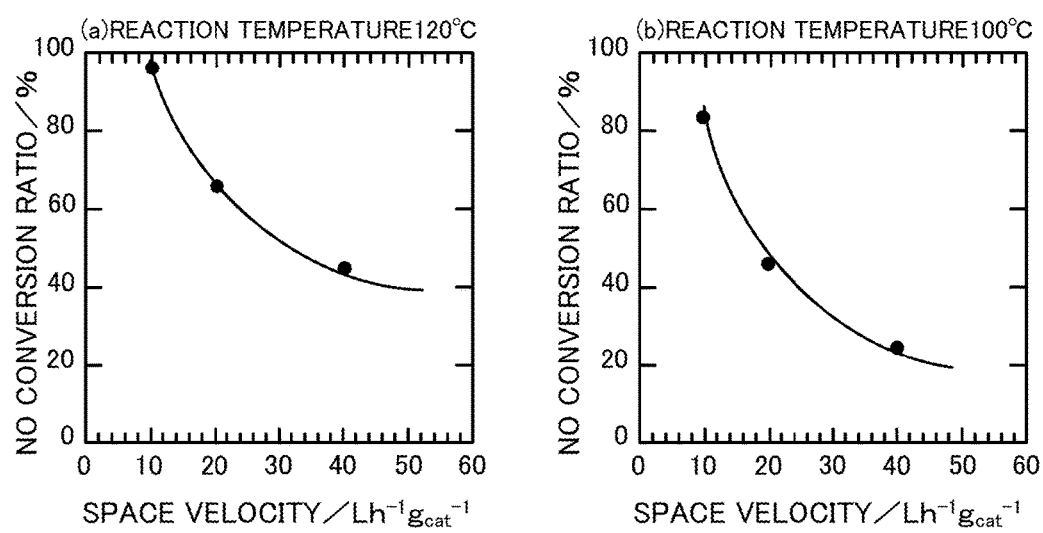
FIG. 6 illustrates the space velocity dependency in the case where a vanadium pentoxide catalyst produced in Reference Example 1 is used in an $NH_3$-SCR reaction.

In the case where the catalyst in Reference Example 1 ($V_2O_5$_300° C.) was used, the space velocity (for gas treatment) dependency was measured by performing the selective catalytic reduction reaction under the conditions listed in Table 3 below. FIG. 6 illustrates the measurement results. FIG. 6(a) illustrates the NO conversion ratio at a reaction temperature of 120° C. FIG. 6(b) illustrates the NO conversion ratio at a reaction temperature of 100° C. The 80% NO detoxification was about 15 $Lh^{-1}g_{cat}^{-1}$ at 120° C. and about 11 $Lh^{-1}g_{cat}^{-1}$ at 100° C. In an experiment in which the space velocity was changed, the $N_2$ selectivity was almost 100%.

TABLE 3

| $NH_3$-SCR measurement conditions | |
| --- | --- |
| Reaction temperature | 120 or 100° C. |
| Amount of catalyst | 0.375 g, 0.750 g, 1.5 g |
| Total gas flow rate | 250 $mLmin^{-1}$ |
| | (NO: 250 ppm, $NH_3$: 250 ppm, |
| | $O_2$: 4 vol %, Ar balance) |
| Space velocity | 10-40 $Lh^{-1}g_{cat}^{-1}$ |
| Gas flow time | 0.5 h |

(Reaction in Coexistence with Water)

Figure 7:
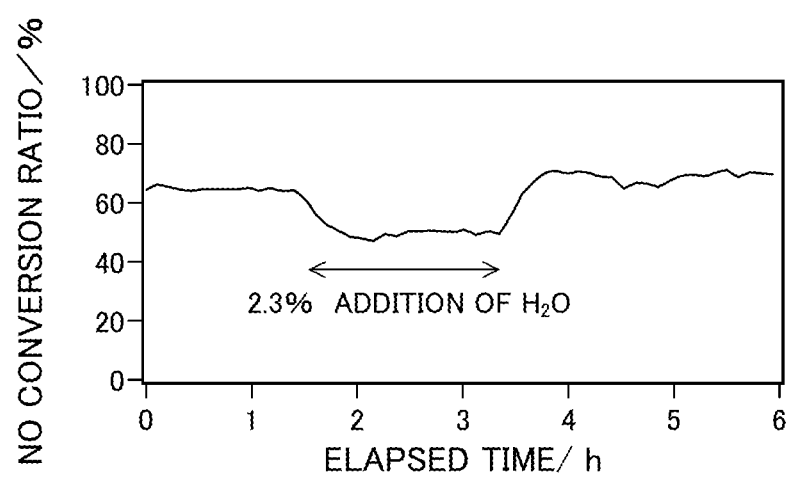
FIG. 7 illustrates a change in the NO conversion ratio over time in the case where a vanadium pentoxide catalyst produced in Reference Example 1 is used in a selective catalytic reduction reaction in coexistence with water.

An experiment of the $NH_3$-SCR reaction was performed using the catalyst in Reference Example 1 ($V_2O_5$_300° C.) under the conditions listed in Table 4 below at a reaction temperature of 150° C. at a space velocity of 20 $Lh^{-1}g_{cat}^{-1}$. FIG. 7 illustrates a change in the NO conversion ratio over time in the experiment. As a result of addition of 2.3% $H_2O$ 1.5 hours after the start of the reaction, the NO conversion ratio decreased from 64% to 50%. The addition of $H_2O$ did not change the $N_2$ selectivity. The $N_2$ selectivity was 100%. As a result of stop of the addition of water 3.5 hours after the start of the reaction, the NO conversion ratio increased to 67%.

TABLE 4

| $NH_3$-SCR measurement conditions | |
| --- | --- |
| Reaction temperature | 150° C. |
| Amount of catalyst | 0.375 g |
| Total gas flow rate | 250 $mLmin^{-1}$ |
| | (NO: 250 ppm, $NH_3$: 250 ppm, |
| | $O_2$: 4 vol %, Ar balance) |
| Space velocity | 20 $Lh^{-1}g_{cat}^{-1}$ |

(Reaction in Coexistence with S)

Figure 8:
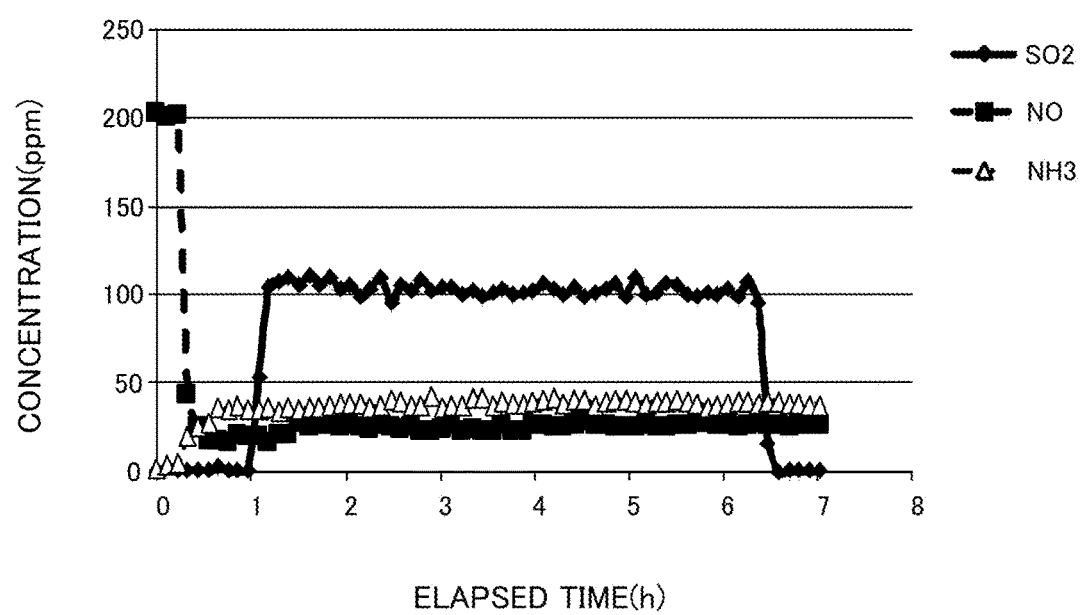
FIG. 8 illustrates changes in the $NH_3$, NO, and $SO_2$ concentrations over time in the case where a vanadium pentoxide catalyst produced in Reference Example 1 is used in a selective catalytic reduction reaction in coexistence with S.

Under the same conditions as those of the experiment of the reaction in coexistence with water, 100 ppm $SO_2$ was caused to flow through a reaction gas. FIG. 8 illustrates the experimental results. No change occurred to the catalytic activity of NO. After the completion of the temperature increase to 150° C., the $SO_2$ concentration did not decrease though $H_2O$ and $O_2$ were constantly present. Consequently, $SO_2$ did not react. Accordingly, the denitration catalysts in Examples were found to have S resistance.

(Relationship Between Amount of Vanadium Pentoxide Supported and NO Conversion Ratio)

Figure 9:
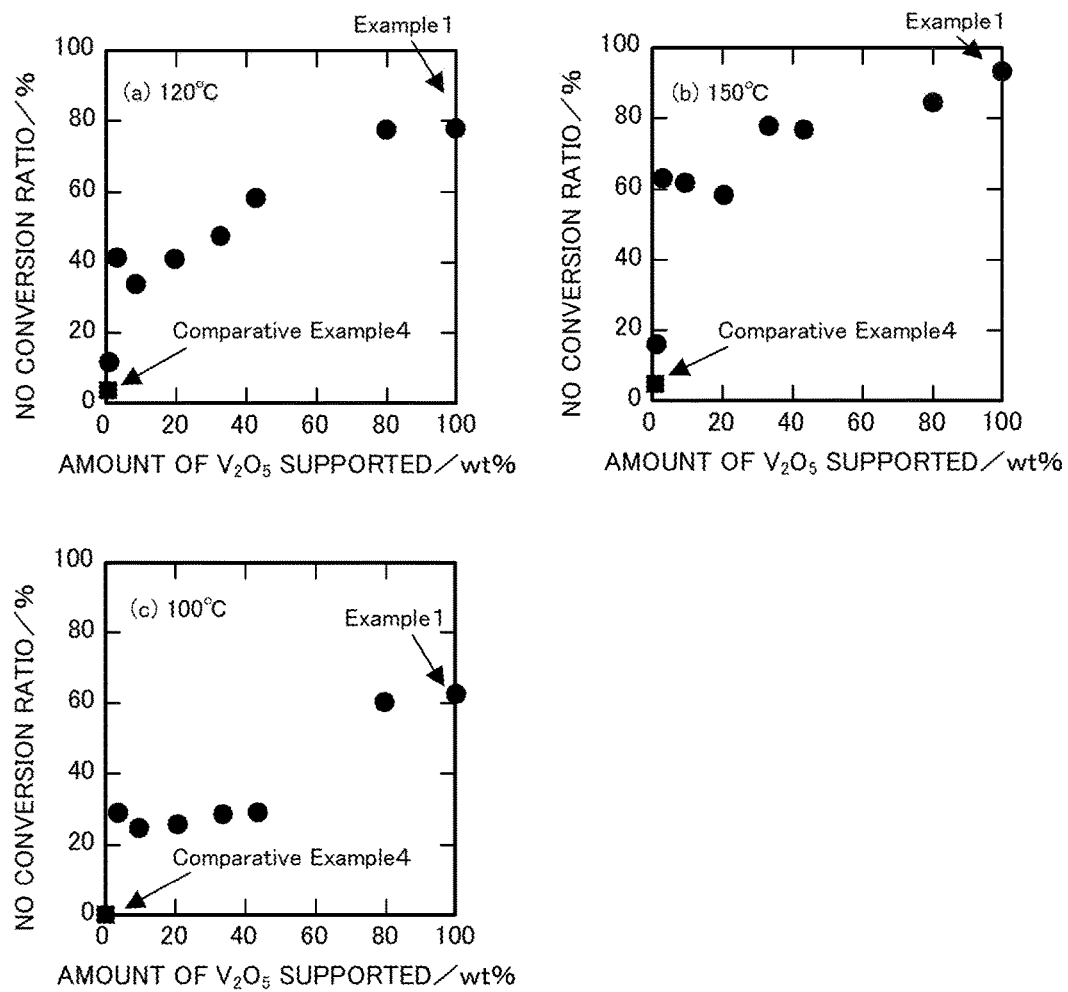
FIG. 9 illustrates the relationship between the amount of vanadium pentoxide supported and the NO conversion ratio of a vanadium pentoxide catalyst produced in each of Examples at each reaction temperature.

FIG. 9 illustrates the relationship between the amount of vanadium pentoxide supported and the NO conversion ratio at each reaction temperature. FIG. 9(a) illustrates the relationship between the amount of vanadium pentoxide supported and the NO conversion ratio at a reaction temperature of 120° C. Similarly, FIG. 9(b) illustrates the relationship between the amount of vanadium pentoxide supported and the NO conversion ratio at a reaction temperature of 150° C., and FIG. 9(c) illustrates the relationship at a reaction temperature of 100° C. In each of the graphs, the catalyst in which the amount of vanadium pentoxide supported is 100 wt % is the denitration catalyst $V_2O_5$_SG_300 produced in Example 1. The points plotted using a square indicate a NO conversion ratio of the existing catalyst in Comparative Example 4. All the graphs showed that, on the whole, the NO conversion ratio increased as the amount of vanadium pentoxide supported was increased. Herein, all the graphs showed that the catalyst in which the amount of vanadium pentoxide supported was 3.3 wt % had a higher NO conversion ratio than the catalyst in which the amount of vanadium pentoxide supported was 9.0 wt %. Specifically, as illustrated in FIG. 9(*a*), in the $NH_3$-SCR reaction at a reaction temperature of 120° C., the NO conversion ratio reached 80% when the amount of vanadium pentoxide supported was increased to 80 wt %. As illustrated in FIG. 9(*b*), in the $NH_3$-SCR reaction at a reaction temperature of 150° C., the NO conversion ratio considerably increased when the amount of vanadium pentoxide supported was increased to 3.3 wt %. As illustrated in FIG. 9(*c*), in the selective catalytic reduction reaction at a reaction temperature of 100° C., the denitration catalyst in which the amount of vanadium pentoxide supported was 80 wt % had a considerably increased NO conversion ratio compared with the denitration catalysts in which the amounts of vanadium pentoxide supported were 43 wt % or less.
(Relationship Between BET Specific Surface Area and NO Conversion Ratio)

Figure 10:
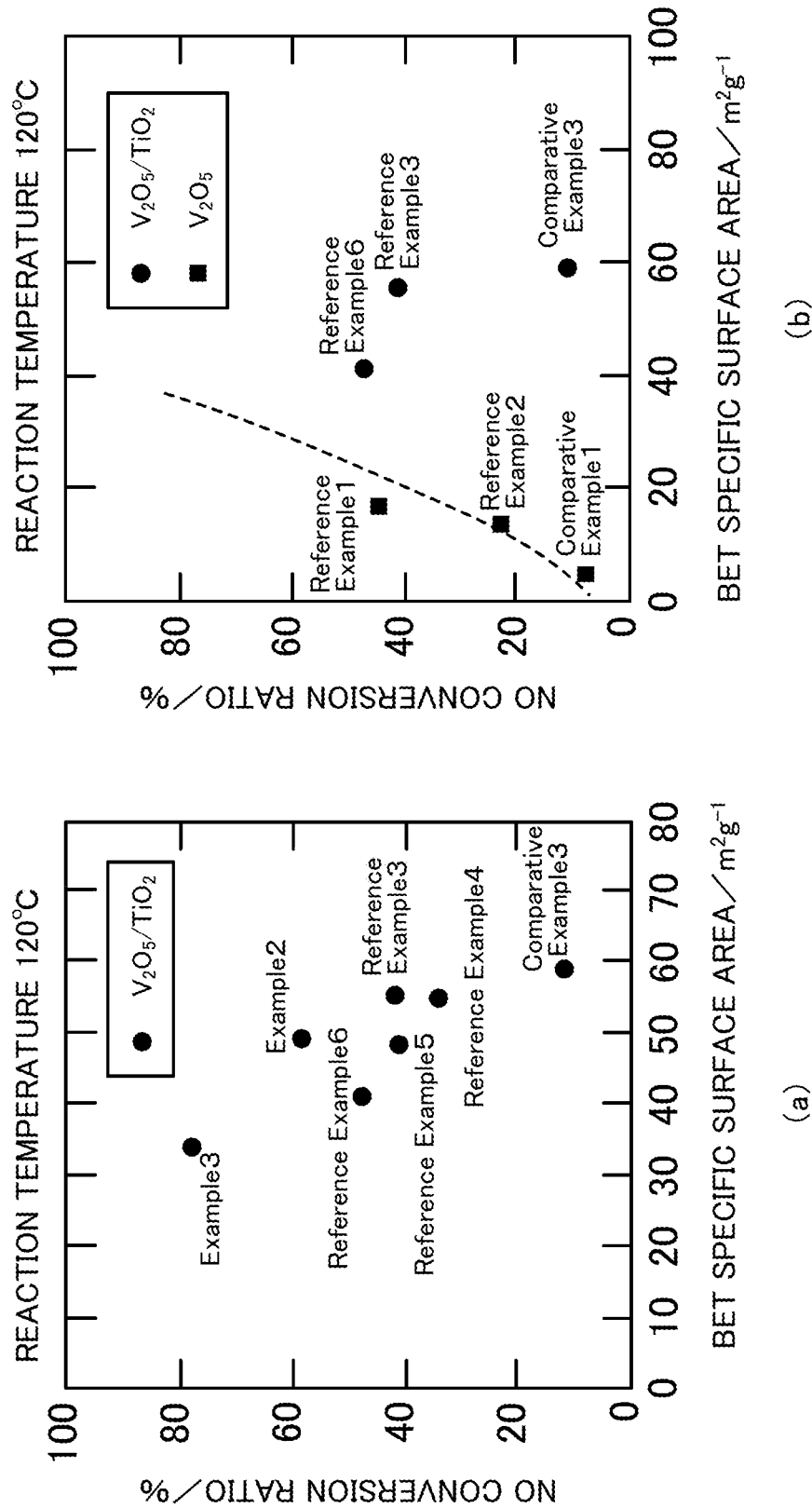
FIG. 10 illustrates the relationship between the BET specific surface area and the NO conversion ratio of a vanadium pentoxide catalyst produced in each of Examples, Reference Examples, and Comparative Examples.

FIG. 10(*a*) illustrates the relationship between the BET specific surface area and the NO conversion ratio of the denitration catalysts in which vanadium pentoxide was supported on titanium oxide. In the denitration catalyst in which vanadium pentoxide was supported on titanium oxide, as the amount of vanadium pentoxide supported was increased, the BET specific surface area decreased, but the activity increased on the whole. FIG. 10(*b*) illustrates the relationship between the BET specific surface area and the NO conversion ratio of both the denitration catalysts in which vanadium pentoxide was supported on titanium oxide and the denitration catalysts in which vanadium pentoxide was not supported on titanium oxide. In the catalysts in which vanadium pentoxide was not supported on titanium oxide, the activity increased with increasing the BET specific surface area.

2. $V_2O_5$ Catalyst Produced Through Sol-Gel Process

2.1 Examples (Examples 4 to 6 and Reference Examples 7 and 8)

In "Example 1" of the above-described "1.1 Examples and Comparative Examples", ammonium vanadate was dissolved in an oxalic acid solution such that the molar ratio of vanadium and oxalic acid was 1:3, then water was evaporated, drying was performed, and the resulting dried powder was fired. Thus, a denitration catalyst was produced. In the denitration catalysts of Reference Example 7, Examples 4 to 6, and Reference Example 8, the molar ratios of vanadium and oxalic acid were set to 1:1, 1:2, 1:3, 1:4, and 1:5, respectively. Specifically, as described above, ammonium vanadate was dissolved in an oxalic acid solution (molar ratio of vanadium:oxalic acid=1:1 to 1:5). After ammonium vanadate was completely dissolved, water in the solution was evaporated on a hot stirrer, and drying was performed in a dryer at 120° C. for one night. Then, the dried powder was fired in the air at 300° C. for 4 hours. The sample names were given as "$V_2O_5$_SG_1:1" (Reference Example 7), "$V_2O_5$_SG_1:2" (Example 4), "$V_2O_5$_SG_1:3" (Example 5), "$V_2O_5$_SG_1:4" (Example 6), and "$V_2O_5$_SG_1:5" (Reference Example 8). Herein, the "$V_2O_5$_SG_300" in "Example 1" of "1.1 Examples and Comparative Examples" and "$V_2O_5$_SG_1:3" in Example 5 were substantially the same, but the sample name "$V_2O_5$_SG_1:3" in "Example 5" was used for the sake of convenience of description. To increase the BET specific surface area, a surfactant may be added to the oxalic acid solution. Examples of the surfactant include anionic surfactants such as hexadecyltrimethylammonium bromide (CTAB), sodium lauryl sulfate (SDS), and hexadecylamine; cationic surfactants; amphoteric surfactants; and nonionic surfactants.

2.2 Evaluation

2.2.1 Powder X-Ray Diffraction
(Diffraction Method)

In the same manner as in 1.2.1, powder X-ray diffraction analysis was performed with a Rigaku smart lab using Cu-Kα.
(Diffraction Result)

Figure 11:
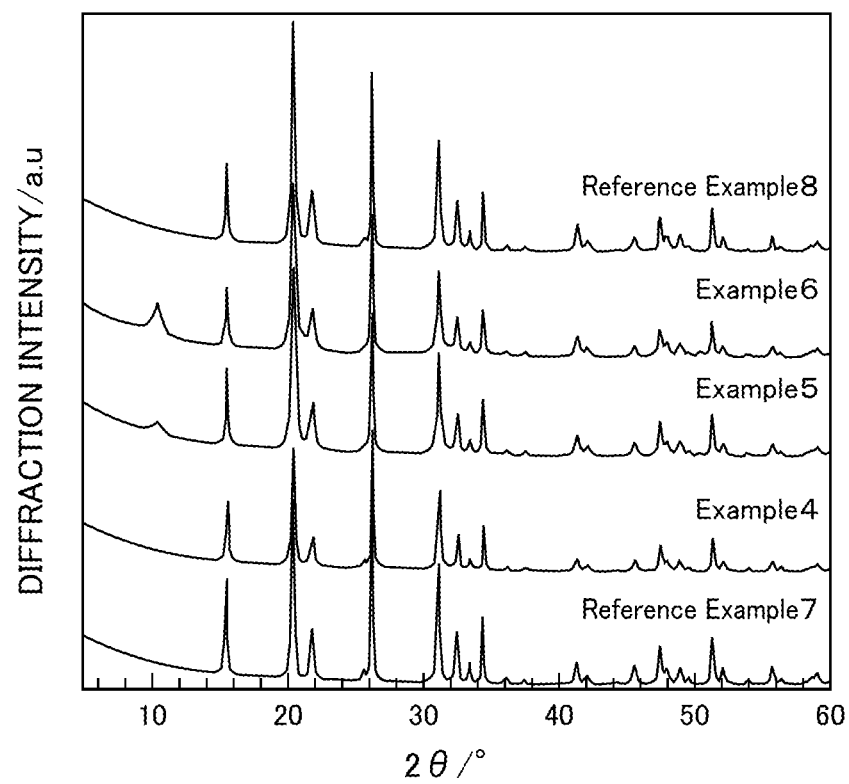
FIG. 11 illustrates the powder X-ray diffraction results of vanadium pentoxide catalysts produced in Examples 4 to 6 and Reference Examples 7 and 8.

FIG. 11 illustrates powder XRD patterns of Reference Example 7, Examples 4 to 6, and Reference Example 8 ($V_2O_5$_SG). In the vanadium pentoxides (Reference Examples 7, 7, and 10) produced using the solutions having vanadium:oxalic acid ratios of 1:1, 1:2, and 1:5, only peaks for orthorhombic $V_2O_5$ were detected. In the vanadium pentoxides (Examples 5 and 6) produced using the solutions having vanadium:oxalic acid ratios of 1:3 and 1:4, an unidentified peak was detected at 11° in addition to the peaks for orthorhombic $V_2O_5$. However, the peak has not been identified yet.

2.2.2 Measurement of BET Specific Surface Area
(Measurement Method)

In the same manner as in 1.2.3, the BET specific surface area was measured with a MicrotracBEL BELSORP-max.

Pretreatment was performed in an Ar atmosphere at 200° C. for 2 hours, and then measurement was performed at 196° C.
(Measurement Result)

TABLE 5

BET specific surface area of vanadium pentoxide catalyst

| Catalyst | | BET specific surface area before reaction/$m^2g^{-1}$ | BET specific surface area after reaction/$m^2g^{-1}$ |
|---|---|---|---|
| Reference Example7 | ($V_2O_5$_SG_1:1) | 29.9 | n.d. |
| Example4 | ($V_2O_5$_SG_1:2) | 33.5 | n.d. |
| Example5 | ($V_2O_5$_SG_1:3) | 62.9 | 43.4 |
| Example6 | ($V_2O_5$_SG_1:4) | 57.0 | n.d. |
| Reference Example8 | ($V_2O_5$_SG_1:5) | n.d. | n.d. |

Table 5 shows BET specific surface areas of Reference Example 7 ($V_2O_5$_SG_1:1), Example 4 ($V_2O_5$_SG_1:2), Example 5 ($V_2O_5$_SG_1:3), Example 6 ($V_2O_5$_SG_1:4), and Reference Example 8 ($V_2O_5$_SG_1:5). As the ratio of the oxalic acid was increased, the specific surface area increased at vanadium:oxalic acid ratios of 1:1 to 1:3. When the ratio of the oxalic acid was further increased, the specific surface area decreased. The specific surface area in Example 5 ($V_2O_5$_SG_1:3) after the catalytic activity test described below considerably decreased to 43.4 $m^2g^{-1}$ compared with the specific surface area before the catalytic activity test.

2.2.3 Measurement of Catalytic Activity
(Measurement Method)

By the same measurement method as in 1.2.4, the $NH_3$-SCR activity of each $V_2O_5$_SG catalyst was measured and the NO conversion ratio was calculated.
(Measurement Result)

Figure 12:
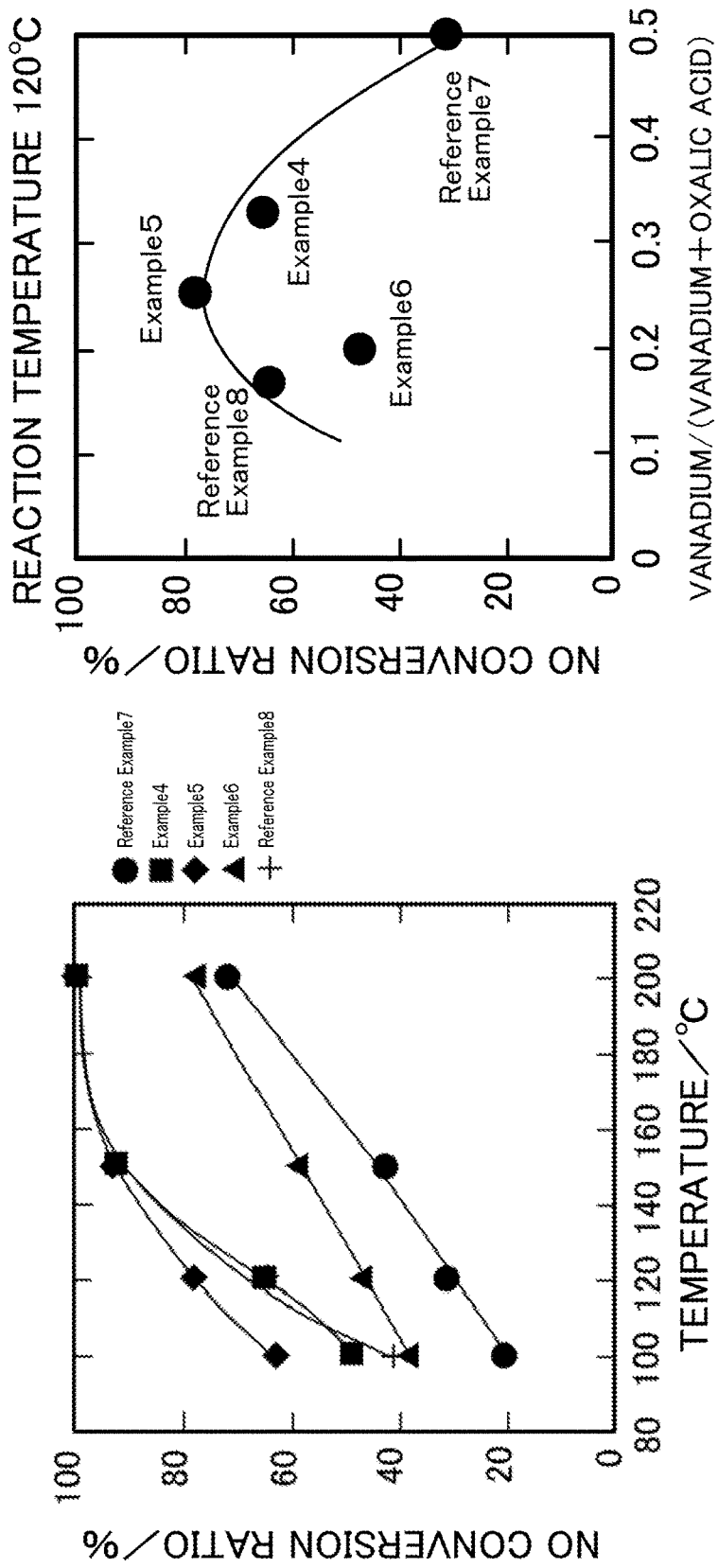
FIG. 12 illustrates the $NH_3$-SCR activity of vanadium pentoxide catalysts produced in Examples 4 to 6 and Reference Examples 7 and 8.

FIG. 12 illustrates the $NH_3$-SCR activity of each $V_2O_5$_SG catalyst. FIG. 12(*a*) illustrates the NO conversion ratio plotted against reaction temperature in the $NH_3$-SCR reaction that uses each catalyst. FIG. 12(*b*) illustrates the relationship between the vanadium:oxalic acid ratio and the NO conversion ratio at a reaction temperature of 120° C. In the catalyst of Example 5 ($V_2O_5\_SG\_1:3$) having a vanadium:oxalic acid ratio of 1:3, the highest NO conversion ratio was achieved. When the oxalic acid was further added, the NO conversion ratio decreased. The NO conversion ratio in Example 6 ($V_2O_5\_SG\_1:4$) was lower than that in Example 4 ($V_2O_5\_SG\_1:2$) despite the fact that the specific surface area in Example 6 was larger than that in Example 4.

(Relationship Between Specific Surface Area and NO Conversion Ratio)

Figure 13:
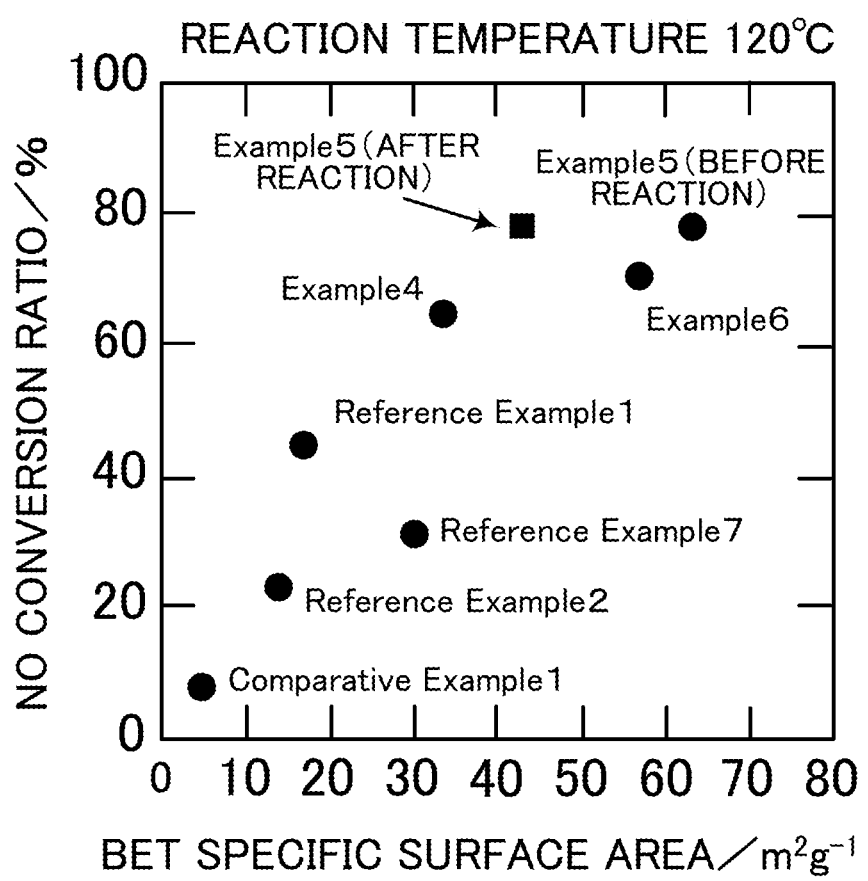
FIG. 13 illustrates the relationship between the specific surface area and the NO conversion ratio of vanadium pentoxide catalysts produced in Examples 4 to 6, Reference Examples 1, 2, and 7, and Comparative Example 1.

FIG. 13 illustrates the relationship between the BET specific surface area and the NO conversion ratio in Examples 4 to 6 and Reference Example 7 ($V_2O_5\_SG$), Reference Example 1 ($V_2O_5\_300$), Reference Example 2 ($V_2O_5\_400$), and Comparative Example 1 ($V_2O_5\_500$). The point plotted using a square indicates the relationship between the BET specific surface area and the NO conversion ratio after the selective catalytic reduction reaction in Example 5 ($V_2O_5\_SG\_1:3$). As described above, it was shown that the highest NO conversion ratio was achieved in the catalyst of Example 5 ($V_2O_5\_SG\_1:3$) having a vanadium:oxalic acid ratio of 1:3.

2.2.4 Characterization by $NH_3$-TPD (Measurement Method)

The amount of acid sites on the surface of the catalyst can be estimated by $NH_3$-TPD (TPD: temperature programed desorption). In a BELCAT manufactured by MicrotracBEL Corp., 0.1 g of each of the catalysts in Reference Example 1 ($V_2O_5\_300$), Reference Example 2 ($V_2O_5\_400$), Comparative Example 1 ($V_2O_5\_500$), Example 4 ($V_2O_5\_SG\_1:2$), and Example 5 ($V_2O_5\_SG\_1:3$) was pretreated at 300° C. for 1 hour while He (50 ml/min) was caused to flow. Then, the temperature was decreased to 100° C., and 5% ammonia/He (50 ml/min) was caused to flow for 30 minutes to adsorb ammonia. The flow gas was changed to He (50 ml/min) and this state was kept for 30 minutes for stabilization. Then, the temperature was increased at 10° C./min and ammonia, which has a mass number of 16, was monitored with a mass spectrometer.

(Measurement Result)

TABLE 6

Measured amount of $NH_3$ desorbed by $NH_3$-TPD

| Catalyst | | Amount of $NH_3$ desorbed/µmolg$^{-1}$ |
|---|---|---|
| Reference Example1 | ($V_2O_5\_300$) | 22.9 |
| Reference Example2 | ($V_2O_5\_400$) | 14.0 |
| Comparative Example1 | ($V_2O_5\_500$) | 5.21 |
| Example4 | ($V_2O_5\_SG\_1:2$) | 51.4 |
| Example5 | ($V_2O_5\_SG\_1:3$) | 77.5 |

Table 6 shows the measurement results of the amount of $NH_3$ desorbed when the catalysts in Reference Example 1 ($V_2O_5\_300$), Reference Example 2 ($V_2O_5\_400$), Comparative Example 1 ($V_2O_5\_500$), Example 4 ($V_2O_5\_SG\_1:2$), and Example 5 ($V_2O_5\_SG$ 1:3) were used.

Figure 14:
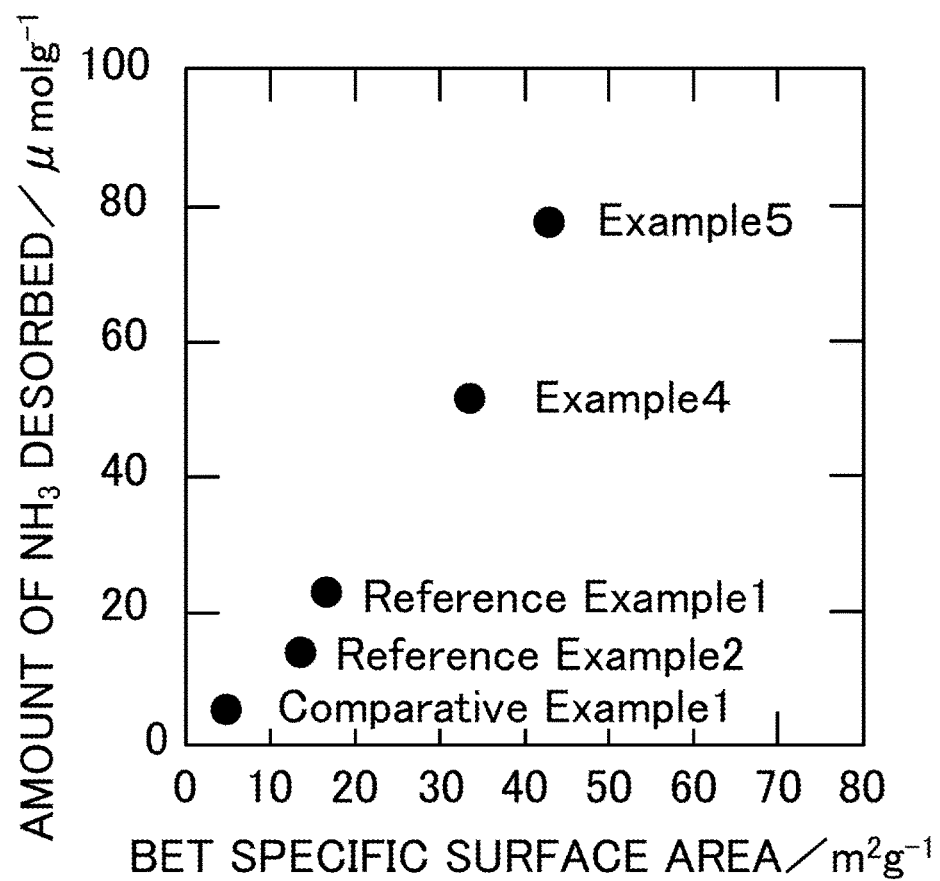
FIG. 14 illustrates the relationship between the BET specific surface area and the amount of $NH_3$ desorbed of vanadium pentoxide catalysts produced in Examples 4 and 5, Reference Examples 1 and 2, and Comparative Example 1.
Figure 15:
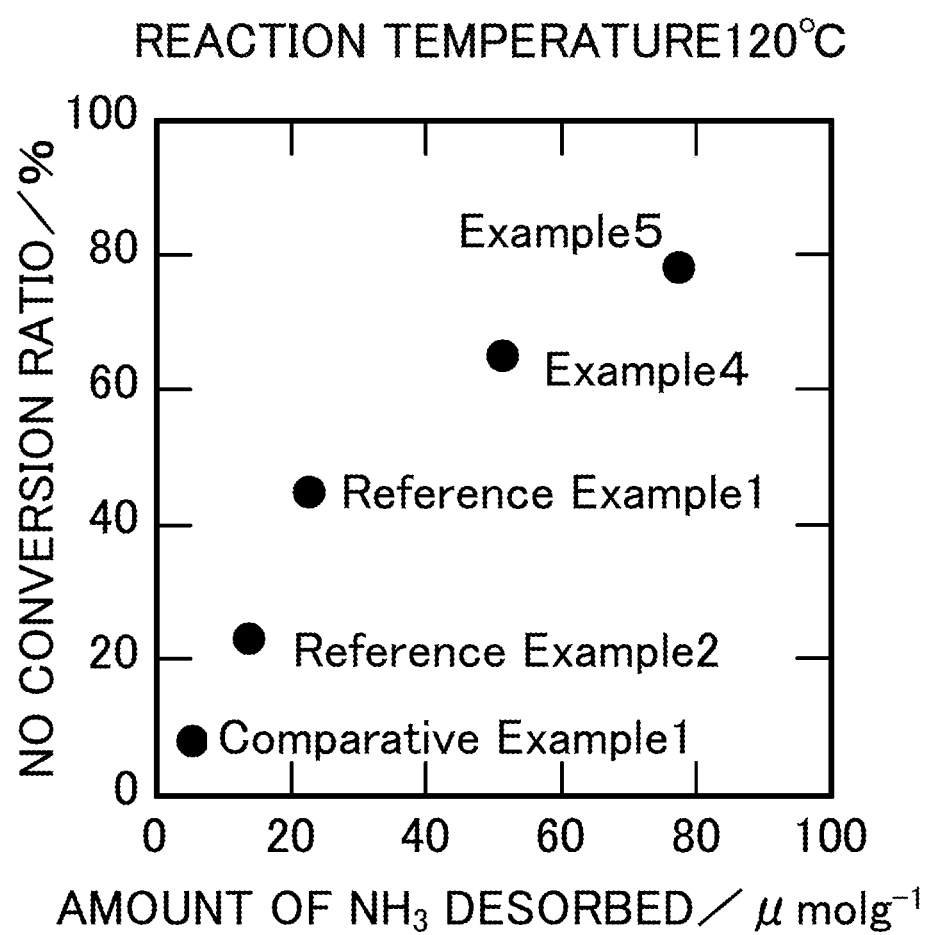
FIG. 15 illustrates the relationship between the amount of $NH_3$ desorbed and the NO conversion ratio of vanadium pentoxide catalysts produced in Examples 4 and 5, Reference Examples 1 and 2, and Comparative Example 1.

FIG. 14 is a graph obtained by plotting the amount of $NH_3$ desorbed as a function of the BET specific surface area of each catalyst. The graph in FIG. 14 showed that the amount of $NH_3$ desorbed increased substantially in proportion to the BET specific surface area of $V_2O_5$. FIG. 15 is a graph obtained by plotting the NO conversion ratio as a function of the amount of $NH_3$ desorbed in each catalyst. The graph showed that the NO conversion ratio increased as the catalyst had a larger amount of $NH_3$ desorbed, that is, a larger amount of acid sites on the surface of the catalyst.

As described above, the denitration catalyst of the present invention that contains 3.3 wt % or more of vanadium oxide in terms of vanadium pentoxide and has a specific surface area of 10 m$^2$/g or more exhibits a high denitration efficiency at a low temperature of 200° C. or lower in the selective catalytic reduction reaction that uses ammonia as a reducing agent. On the other hand, oxidation of $SO_2$ is not found.

EXPLANATION OF REFERENCE NUMERALS

1 combustion system for ships
10 fuel supply device
20 internal combustion engine
30 dust collector
40 exhaust heat recovery device
41 turbine device
45 exhaust gas economizer
50 denitration device
60 smokestack
70 shaft motor

The invention claimed is:

1. A combustion system for ships, comprising:
an internal combustion engine that burns fuel;
an exhaust line through which exhaust gas flows, the exhaust gas being generated through combustion of the fuel in the internal combustion engine;
an exhaust heat recovery device that is disposed in the exhaust line and that recovers exhaust heat from the exhaust gas discharged from the internal combustion engine; and
a denitration device that is disposed in the exhaust line and that removes nitrogen oxide from the exhaust gas using a denitration catalyst,
wherein the denitration device is disposed downstream from the exhaust heat recovery device in the exhaust line, and
the denitration catalyst contains 43 wt % or more of vanadium pentoxide and has a BET specific surface area of 30 m$^2$/g or more.

2. The combustion system for ships according to claim 1, wherein the exhaust heat recovery device includes a turbine device and an exhaust gas economizer,
the exhaust gas economizer generates steam using, as heat sources, exhaust gas discharged from the internal combustion engine and exhaust gas supplied from the turbine device, and
the turbine device generates electric power using the exhaust gas discharged from the internal combustion engine and the steam supplied from the exhaust gas economizer.

3. The combustion system for ships according to claim 2, wherein the electric power generated in the exhaust heat recovery device is used to supplement motive power generated by the internal combustion engine.

4. The combustion system for ships according to claim 1, further comprising a dust collector that is disposed in the exhaust line and that collects dust in the exhaust gas,
wherein the dust collector is disposed upstream from the denitration device in the exhaust line.

5. The combustion system for ships according to claim 1, wherein in the denitration catalyst, an amount of $NH_3$ desorbed by $NH_3$-TPD (TPD: temperature programed desorption) is 10.0 µmol/g or more.

* * * * *